United States Patent
Kwok-Suzuki et al.

(10) Patent No.: US 10,055,566 B2
(45) Date of Patent: *Aug. 21, 2018

(54) USING BIOMETRIC USER-SPECIFIC ATTRIBUTES

(71) Applicant: Tessera Advanced Technologies, Inc., San Jose, CA (US)

(72) Inventors: Eliza Kwok-Suzuki, San Jose, CA (US); Robert S. Dordick, San Jose, CA (US); Christopher Lattin, Santa Cruz, CA (US)

(73) Assignee: Tessera Advanced Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,272

(22) Filed: Aug. 18, 2017

(65) Prior Publication Data

US 2017/0372052 A1  Dec. 28, 2017

Related U.S. Application Data

(63) Continuation of application No. 14/843,726, filed on Sep. 2, 2015, now Pat. No. 9,740,841.

(60) Provisional application No. 62/047,568, filed on Sep. 8, 2014.

(51) Int. Cl.
*H04L 29/06* (2006.01)
*G06F 21/32* (2013.01)
*G06F 21/31* (2013.01)

(52) U.S. Cl.
CPC ............ *G06F 21/32* (2013.01); *G06F 21/316* (2013.01); *H04L 63/0861* (2013.01); *H04L 2463/082* (2013.01)

(58) Field of Classification Search
CPC ..... G06F 21/32; G06F 21/316; H04L 63/0861
USPC .......................................................... 726/7
See application file for complete search history.

(56) References Cited

U.S. PATENT DOCUMENTS

| | | | |
|---|---|---|---|
| 5,719,950 A | 2/1998 | Osten et al. | |
| 7,358,514 B2 | 4/2008 | Setlak et al. | |
| 7,440,929 B2* | 10/2008 | Schneider | G06K 9/00885 382/115 |
| 7,596,246 B2 | 9/2009 | Miller, Jr. et al. | |
| 8,090,945 B2* | 1/2012 | Singhal | G06F 21/32 713/168 |
| 8,368,510 B2 | 2/2013 | Luckhardt | |
| 8,646,056 B2* | 2/2014 | Poplett | G06F 21/31 726/2 |
| 9,280,696 B1* | 3/2016 | Fraser | G06K 9/00577 |
| 2006/0126904 A1 | 6/2006 | Lee et al. | |
| 2006/0294387 A1* | 12/2006 | McCracken | G06F 21/42 713/182 |
| 2007/0009139 A1* | 1/2007 | Landschaft | H04M 1/66 382/115 |

(Continued)

*Primary Examiner* — Michael S McNally
(74) *Attorney, Agent, or Firm* — Hickman Palermo Becker Bingham LLP; Malgorzata A. Kulczycka

(57) ABSTRACT

Techniques are provided for determining two or more user-specific parameters that can be measured or obtained using various methods, and using values of the two or more user-specific parameters to uniquely identify or authenticate an individual. Examples of the user-specific parameters may include biometric parameters, textual-based parameters, a combination of biometric parameters and textual-based parameters, and the like.

20 Claims, 9 Drawing Sheets

(56) References Cited

U.S. PATENT DOCUMENTS

| | | | |
|---|---|---|---|
| 2007/0094715 A1* | 4/2007 | Brown | G06F 21/34 |
| | | | 726/5 |
| 2007/0240203 A1* | 10/2007 | Beck | G06F 21/33 |
| | | | 726/4 |
| 2008/0189776 A1* | 8/2008 | Constable | G06F 21/32 |
| | | | 726/7 |
| 2009/0172795 A1* | 7/2009 | Ritari | H04L 63/0815 |
| | | | 726/7 |
| 2011/0030040 A1* | 2/2011 | Ronchi | G06F 21/126 |
| | | | 726/5 |
| 2011/0040574 A1 | 2/2011 | Fung et al. | |
| 2013/0247159 A1* | 9/2013 | Hall | G06F 21/31 |
| | | | 726/6 |
| 2014/0157381 A1* | 6/2014 | Disraeli | G06F 21/31 |
| | | | 726/7 |
| 2014/0304795 A1* | 10/2014 | Bruno | G06F 21/32 |
| | | | 726/9 |
| 2015/0067808 A1* | 3/2015 | Varghese | G06F 21/32 |
| | | | 726/7 |
| 2015/0286811 A1* | 10/2015 | Phan | G06F 21/32 |
| | | | 726/7 |
| 2016/0087957 A1* | 3/2016 | Shah | H04L 63/205 |
| | | | 726/1 |
| 2016/0099925 A1* | 4/2016 | Kunapuli | H04L 63/104 |
| | | | 726/5 |

* cited by examiner

USING BIOMETRIC USER-SPECIFIC ATTRIBUTES

CROSS-REFERENCE TO RELATED APPLICATIONS; BENEFIT CLAIM

This application claims the benefit under 35 U.S.C. § 120 as a Continuation of Application Ser. No. 14/843,726, filed Sep. 2, 2015, now Patent No. 9,740,841, which claimed the benefit of Provisional Application Ser. No. 62/047,568, filed Sep 8, 2014, the entire contents of which are hereby incorporated by reference as if fully set forth herein, under 35 U.S.C. § 119(e). The applicants hereby rescind any disclaimer of claim scope in the parent application or the prosecution history thereof and advise the USPTO that the claims in this application may be broader than any claim in the parent application.

TECHNICAL FIELD

The present disclosure generally relates to determining one or more combinations of values of one or more biometric attributes and parameters that are unique to a user, and using the values of the attributes and parameters to control user's access to secure devices and to determine whether the user is capable of performing certain functions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Existing biometric identification and authentication methods usually involve verification of values of a single parameter against some norms or baseline data. The norms or the baseline data may be determined based on the averaged values computed for a population of individuals exhibiting similar characteristics or attributes. However, as the requirements for the authentication and security systems become more rigorous, relying on the norms or the baselines often becomes insufficient and inadequate.

As computer technologies become more and more sophisticated, new and additional demands are placed on authentication and security systems. However, the conventional authentication and security systems are often unable to keep up with the new demands. These days, when even quite complex conventional security systems can be compromised, the conventional systems appear to be unreliable or obsolete. For example, some of the conventional security systems may be unable to distinguish the falsely identified breaches (also referred to as "false positive") from the real security breaches.

SUMMARY

Techniques are provided for determining two or more user-specific parameters that can be measured or obtained using various methods, and using values of the two or more user-specific parameters to uniquely identify or authenticate the user. Examples of the user-specific parameters may include biometric parameters, textual-based parameters, a combination of biometric parameters and textual-based parameters, and the like.

Two or more user-specific parameters are selected in such a way that the values sampled for a user may be used to uniquely identify the user and to distinguish the user from any other user. The disclosure is directed to parameters selected based on biometric characteristics of individuals; however, other types of parameters may also be used.

A successful identification and/or authentication of an individual may occur when the values entered, or otherwise provided, to a system by a user when the user requests an access to resources match the values of two or more biometric user-specific parameters stored in a reference database. If a match is found, then the user may be positively identified and/or successfully authenticated to the system. For example, when the values provided by the user when the user requests an access to a building match the values of two or more user-specific characteristics stored in a reference database for a user, then the user may be positively authenticated to the building security system and granted access to the building.

Values of two or more user-specific parameters may be compared with the values stored in a reference database to not only uniquely identify or authenticate a user, but also to determine whether the user is capable of performing certain functions or actions. If a match is found, then the system may determine that the user is capable of performing certain functions, such as to withdraw funds from a bank account, watch a PG-13-rated television program, and the like. According to another example, if the values collected or sampled from a user at a particular moment match the reference values stored for the individual in a reference database, then the system may determine whether the user is under the influence of alcohol, and if so, prevent the user from operating machinery or automobiles.

In an embodiment, a system that performs an identification and/or authentication of an individual and/or determines the individual's capabilities to perform certain functions based on two or more biometric user-specific characteristics may be more reliable and accurate than a system that performs such steps by relying only on one parameter. For example, relying just on one characteristic, such as a heart pulse rate of an individual, may be insufficient to uniquely identify the individual since it is possible that two or more individuals may have the same pulse rate at a particular moment.

Furthermore, a system that relies on a comparison between the values of two or more biometric user-specific parameters stored in a reference database and the values of the parameters entered to the system by the user when the user requests access to resources, may be more reliable and accurate than a system that relies on a comparison based on the norms computed from averaged values sampled from a population of users. For example, using a comparison between normalized values (norms) and values entered by an individual may be not as accurate as using a comparison between the actual samples for the individual, not for the population of individuals.

DESCRIPTION OF EXAMPLE EMBODIMENTS

Figure 1:
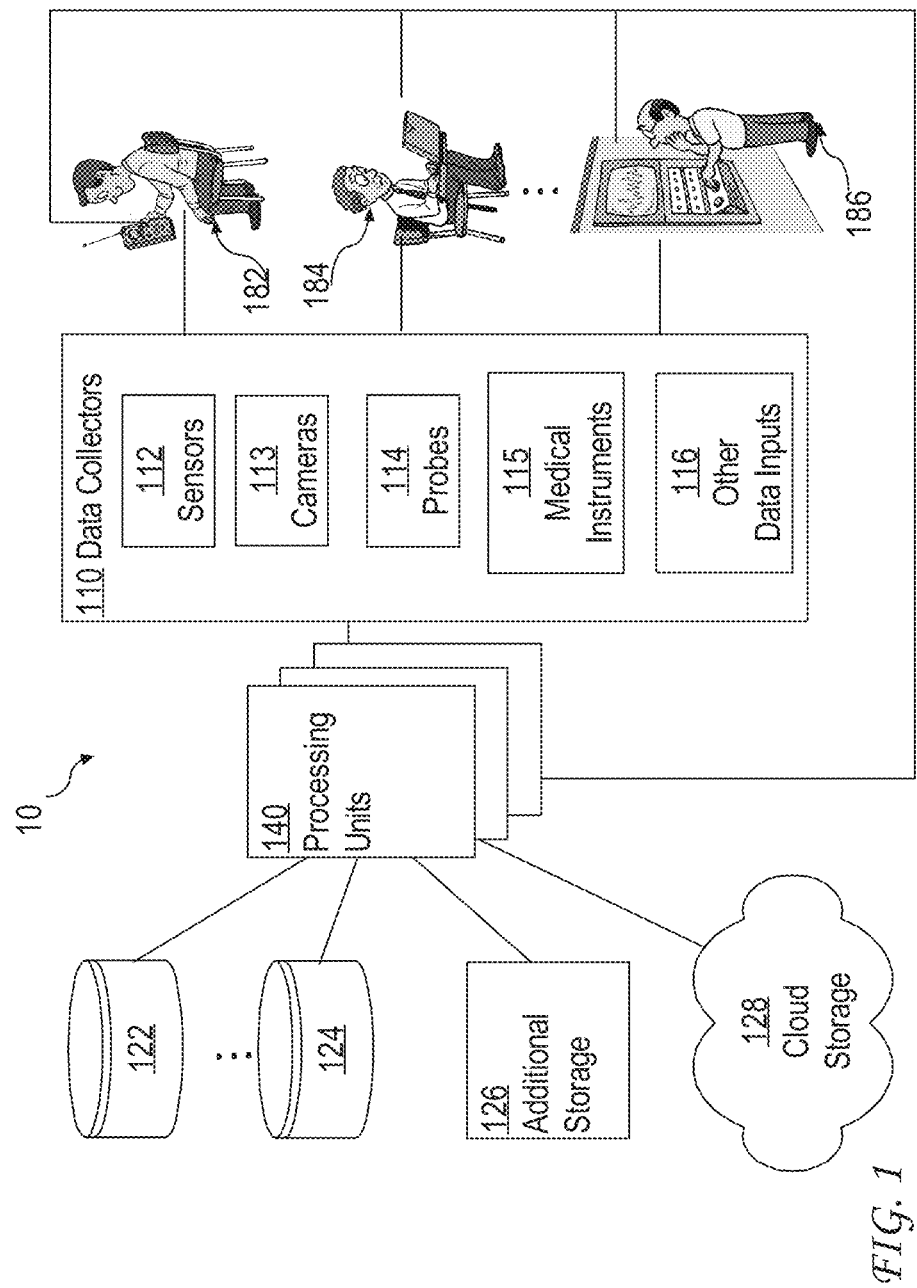
FIG. 1 illustrates computer environment configured to collect and use biometric and physiological attributes to identify/authenticate a user and to determine user's capabilities to perform certain functions.

In the following description, for the purposes of explanation, numerous specific details are set forth in order to provide a thorough understanding of the present approach. It will be apparent, however, that the present approach may be practiced without these specific details. In other instances, well-known structures and devices are shown in block diagram form in order to avoid unnecessarily obscuring the present approach.

General Overview and Benefits of Embodiments

Techniques are provided for determining two or more user-specific parameters that can be measured or otherwise obtained, and using values of the two or more user-specific parameters to uniquely identify or authenticate an individual. Examples of the user-specific parameters may include biometric parameters, such as behavioral biometric parameters, physiological biometric parameters, and the like. Behavioral biometric parameters may include voice and speech characteristics of an individual, and the like. Physiological biometric parameters may include papillary lines of a thumb of an individual, and the like. Additional examples of user-specific parameters and characteristics are described in FIG. 2.

For illustration purposes, various embodiments are described in context of biometric user-specific parameters. However, the embodiments are not limited to the biometric user-specific parameters. For example, the user-specific parameters may include textual-based parameters, a combination of biometric parameters and textual-based parameters, a combination of biometric parameters and other types of parameters, just biometric parameters, and other combination of user-specific parameters.

In an embodiment, an approach for a successful identification and/or authentication of an individual is provided. A successful identification/authentication of a user may occur when the values entered, or otherwise provided, to a system by the user when the user requests an access to resources match the values of two or more biometric user-specific parameters stored in a reference database. If a match is found, then the user may be for example, positively identified and/or successfully authenticated to the system. For example, when the values provided by the user when the user requests an access to an online bank account match the values of two or more user-specific characteristics stored in a reference database for a user, then the user may be positively authenticated to the bank security system and granted access to the account.

Two or more biometric user-specific parameters are referred to as a combination of the user-specific parameters. A combination may be determined by selecting such two or more biometric (or other) user-specific characteristics that, in combination, are unique to the user. Since relying on just one characteristic may be sometimes insufficient or lead to false-positives, relying on two or more characteristics selected in such a way that the combination is unique to the user provides more reliable results. For example, if a user wears a watch, and the watch is programmed to measure a heart pulse rate of the user and transmit the pulse rate readings to an authentication system, then even if the pulse rate is taken accurately, the authentication system that relies only on the pulse rate readings may be inaccurate since more than one individual may have the same pulse rate. However, if the watch is programmed to measure a pulse rate of the user, take a voice sample of the user, and transmit both the pulse rate reading and the voice sample to an authentication system, then the authentication system that analyzes the combination of the pulse rate readings and voice samples may be quite accurate since it is unlikely that two individuals would have the same pulse rate and voice characteristics.

Using combinations of two or more user-specific characteristics may be used to identify and/or authenticate a user who attempts to gain access to a variety of devices. For example, the combinations of user-specific characteristics may be used to grant access to devices, such as laptops, tablets, smart phones, computers, workstations, and the like. Further, the combinations of user-specific characteristics may be used to grant access to appliances, such as refrigerators, wine coolers, television sets, stereo systems, residential alarm systems, commercial alarm systems, elevators, household appliances, and the like. Moreover, the combinations of user-specific characteristics may be used to grant access to vehicles, boats, and others. For example, a vehicle alarm system may be programmed to collect from a user values of two or more user-specific characteristics, and based on the collected values determine whether the user may open the car door, start the car engine, drive the vehicle, and the like.

Relying on a combination of two or more characteristics is more reliable than relying on just one characteristic because it provides more data that is specific to the user. Conventional vehicle alarm systems that rely just on one piece of information are inferior to the proposed approach. In the conventional vehicle alarm systems, the system may just test whether the user is in possession of an electronic key to the vehicle and if so, allow the user to open the car door and start the engine. However, the conventional system does not check for example, whether it is indeed the authorized user that is in possession of the electronic key to the vehicle. In contrast, the presented approach applied to a vehicle alarm system may take into consideration two or more user-specific characteristics, and tests the values of such characteristics before the system grants the user access to the vehicle.

Matching criteria may be defined in a variety of ways. For example, if a comparison involves comparing voice samples, then audio frequencies included in the voice samples may be compared. If a comparison involves comparing readings from medical instruments such as an EKG machine, then EKG signals may be compared with the reference signals. Other examples are provided below.

A comparison may involve comparing two or more values whether they match exactly, or whether they match within certain ranges or certain error margins. For example, if a comparison involves comparing a reading from a blood-pressure-measuring device and a reference value stored in a reference database, then the system may try to find whether the reading matches the reference value exactly, or whether the reading matches the reference value within a certain error margin.

Values of two or more user-specific parameters may be compared with the values stored in a reference database to not only uniquely identify or authenticate a user, but also to determine whether the user is capable of performing certain functions or actions. If a match is found, then the user's capabilities to perform a certain function or functions may be determined. For example, the values collected or sampled from a user at a particular moment may be compared with reference values stored for the individual in a reference database to determine whether the user is under influence of alcohol, and if so, defeat the user's attempts to operate machinery or automobiles. Furthermore, the system may be configured to continue to perform the functions in various modes, as well as support various monitoring functions.

In an embodiment, the system is equipped with eye-tracking devices to monitor the eyes or face movements of a driver. Based on the input collected by the eye-tracking devices, the system may determine whether the driver is capable of driving the vehicle. If the driver appears to be under the influence of alcohol, then the system may prevent the user from starting the vehicle, or if the user is already driving the vehicle, gradually reduce the speed of the vehicle, and/or eventually disable the engine of the vehicle.

According to another example, when a voice's sample provided by a user when the user tries to start an engine of a vehicle matches the voice sample stored in a reference database for the user, and the user's fingerprint sample provided by the user when the user tries to start the engine match the fingerprint sample stored in the reference database for the user, then the user may be positively authenticated to the vehicle security system, and the vehicle engine may start.

According to other example, if a user's speech pattern and characteristics collected by microphones located inside a vehicle do not match the user's speech patterns and characteristics stored in a reference database for the user, then the user's attempts to start an engine of the vehicle may be ineffective. If a user appears to be under the influence of alcohol, then the user's speech pattern and characteristics collected by microphones located inside a vehicle may be different than the user's speech patterns and characteristics stored in a reference database and representing the user's behavior when the user is not under influence of alcohol. In such a case, based on the comparison, the vehicle security system may prevent the user from staring the vehicle.

A system that performs an identification and/or authentication of an individual and/or determination of the individual's capabilities to perform certain functions based on the two or more biometric user-specific characteristics may be more reliable and accurate than a system that performs such steps by replying only on one parameter. For example, relying just on one characteristics, such as the individual's facial characteristics, may be insufficient to uniquely identify the individual since it is possible that more than one individual may have the same facial characteristics.

In an embodiment, a system relies on a comparison between the values of the two or more biometric user-specific parameters stored in a reference database and the values of the parameters entered to the system by the user when the user requests access to resources. Such a system may be more reliable and accurate than a system that relies on a comparison between the norms computed from averaged values and the values entered by the user. For example, using a comparison between normalized values (norms) and values entered by an individual may be not as accurate as using a comparison between the actual values if a norm is determined based on the values of certain characteristics of a certain population of individuals. Such a norm may represent an averaged value computed from multiple values, and thus may not be sufficiently specific to a particular individual. In contrast, by using a comparison between the values of user-specific parameters, the determination may be more accurate and may reduce the count of false-positives.

Structural Overview

In an embodiment, a system is configured to perform identification/authentication of a user and/or to determine whether the user is capable of performing certain functions or actions.

FIG. 1 illustrates computer environment 10 configured to collect and use biometric and physiological attributes to identify/authenticate a user and to determine user's capabilities to perform certain functions. In the illustrated example, one or more data collectors 110 collect data from a user and user's devices, and collect data from other user-specific data. Data collectors 110 may include a variety of sensors 112, cameras 113, medical instruments 115, and other data input devices. Examples of various data collectors 110 are further described in FIG. 4.

Data collectors 110 may collect data from various sources and using a variety of methods. For example, data collectors 110 may collect the data from user's mobile devices, as depicted for user 182. The user's mobile devices may include smart phones, electronic watches, eye-glasses, portable sensors, portable communication devices, and the like.

Data collectors 110 may also collect data from user's portable computers, as depicted for user 184. The portable computers may include laptops, smart phones, tablets, smart pens, portable sensors, and the like. Furthermore, the data may be collected from user's computers, workstations, and the like.

Data collectors 110 may also collect data from user's interfaces associated with various types of appliances and computing devices, as depicted for user 186. For example, the data may be collected from user's interfaces implemented in large home appliances, such as refrigerators, freezers, washing machines, dryers, dishwashers, microwaves, stoves, electrical heaters, gas heaters, and the like. Further, the data may be collected from the user's interfaces implemented in small home appliances, such as wine coolers, small electrical appliances, and the like.

Furthermore, data collectors 110 may collect data from user's interfaces of security systems, such as alarm systems, commercial security systems, residential security systems, banks, credit unions, and the like.

Moreover, data collectors 110 may collect data from sensors, cameras and other devices and instruments configured to provide biometric data of the user. Some of the examples of such devices are described in FIG. 4.

Data collectors 110 may also collect data from vehicles, motorcycles, elevators, security compartments, and other engine-operated devices. For example, the data may be collected from the sensors and cameras installed in vehicles, elevators, and the like.

Processing units 140 may comprise one or more units configured to collect data provided by data collectors 110, and one or more applications configured to implement the presented approach. For example, processing units 140 may be configured to process the collected data, generate characteristics combinations, store the combinations in databases, use the characteristics combinations to identify/authenticate users and use the characteristics combinations to determine whether the users are capable of performing certain functions. Examples of various processing units 140 are described in FIG. 5.

In an embodiment, data provided to, processed by, and generated by processing units 140 may be stored in one or more storage devices 122, 124, 126, 128. For example, the data may be stored in one or more database implemented in one or more storage devices, such as disks 122, 124. The data may also be stored in one or more cloud storage systems 128, and any additional storage devices, such as an additional storage 126.

In an embodiment, one or more storage devices, from storage devices 122, 124, 126, 128, are local storage devices with respect to processing units 140, while other storage devices may be remote storage devices with respect to processing units 140. Depending on the implementations, the storage devices may be shared, centrally or locally managed, and the like.

In an embodiment, the system is configured to receive inputs from a user, and based on the provided inputs and data stored in reference database, determine whether the user's request to access resources may be granted. If a match between the user-provided input and reference data stored for the user in the reference database is found, than the system may generate instructions and send the instructions to the devices which the user attempted to access. For example, if a user tried to watch an adult movie on television, but the system determined that the user is a child and does not meet the requirements set in parental-control-settings for the television programs, then the system may prevent the user (child) from watching the adult movie.

Biometric Characteristics

Biometric identifiers encompass a wide range of human or mammalian physiological and behavioral characteristics. Physiological characteristics may be further categorized as "physical" in nature, such as fingerprints, palm prints, vein patterns, facial features patterns, palm lines and patterns, foot-imprint lines and patterns, retinal iris patterns, and the like. Other characteristics such as pulse rates, DNA codes, blood oxygen or alcohol contents, blood sugar levels, body scents and odors, body temperature readings, respiration rates, blood pressure readings, and the like may be described as "biological" in nature. Behavioral characteristics may include voice intonations, gait characteristics, gestures (smile/frown, eye blink), handwriting patterns, and the like.

In an embodiment, a biometric identification and authentication system employs two or more physiological (either physical or biological), and behavioral characteristics, and therefore, is capable of more accurately and reliably identify and authenticate users than the conventional systems can do.

In an embodiment, a biometric identification and authentication system is configured to determine specific combinations of selected characteristics and use the determined specific combinations to identify and authenticate users and/or to determine whether the users are capable of performing certain functions. Examples of such combinations may include a combination comprising of facial features characteristics and fingerprints characteristics, a combination comprising face features characteristics and palm imprint characteristics, a combination of voice frequencies characteristics and facial features characteristics, a combination of retinal iris patterns characteristics and voice frequencies characteristics, and the like.

A multi-modal biometric identification and authentication system may employ combinations of only physiological biometric characteristics, combinations of only biological characteristics, combinations of only behavioral characteristics, and combinations of any two or more types of characteristics.

Values of biometric characteristics may be collected using various sensors and detectors, various data measuring and collecting devices, various probes, and the like.

Furthermore, values of biometric characteristics may be collected using different types of data collections and different data collection schedules. For example, the values of the characteristics may be collected simultaneously. In other embodiments, one or more of the values of the characteristics may be collected at certain time intervals, according to certain schedules, and the like. Thus, a user who may have been granted access may have that access revoked due to some disqualifying characteristic change. For example, if a user's heart rate indicates that the user is experiencing a cardiac arrest, the appliance being used may prevent a further operation of the particular system or a particular function in that system. Moreover, if the values change in such a way as to indicate an emergency situation (such as a cardiac arrest or a sudden death), then the device may take certain actions such as alerting emergency response providers, shutting down access to the system or function of system, or the like.

Reference Databases

In an embodiment, values of biometric characteristics are collected and used to generate a reference database. A reference database may comprises one or more databases organized according to any known database organization schemes, including flat databases, hierarchical databases, and the like. The databases may be configured to store values of the biometric characteristics for individuals, and may be indexed based on the individuals' identifiers, populations of individuals, combinations of characteristics determined for individuals and the like.

Values of biometric characteristics may be stored locally and/or remotely with respect to the sensors collecting the values. For example, reference values of characteristics combinations may be stored on a device that is equipped with sensors and that uses the reference values to control access to the device. Alternatively, reference values may be stored at locations that are remote with respect to the device that uses the reference values to control access to the device. For example, reference values may be stored in data storages that are shared by a plurality of devices, in data storage cloud, and third-party storage devices, and the like.

In an embodiment, biometric characteristics may be divided into several groups. One group may include characteristics that are referred to as general characteristics, while another group may include characteristics that are referred to as user-specific or user-inputted characteristics. Other groups may include groups of characteristics that are unique to groups of individuals, or groups of characteristics identified based on the type of devices that may be controlled using such characteristics.

Combinations of Characteristics

Determining combinations that may be used to identify/authenticate users and/or determine whether the users are capable of performing certain actions (or being able to continue performing certain functions) may be accomplished heuristically, or based on a training process, optimization approaches, and the like. For example, an initial model of the combinations may be designed, and based on the training data. The initially determined combinations may be refined and modified until the selection of the combinations meets certain criteria and requirements.

Examples of combinations that may be initially selected as useful in authenticating users may include a combination of a facial features pattern and a blood alcohol level reading. Another example may include a combination of a finger imprint data and a heart pulse rate reading. Other combination may include a voice intonation pattern and a body scent characteristic.

In an embodiment, one or more combinations, each comprising at least two characteristics, may be used to control access to various devices, vehicles, locations, and the like. For example, the system may determine one or more particular combinations of characteristics that may be used to control access to a residential wine cooler. If a user who attempts to open the wine cooler provides certain values of the particular combination of the characteristics that match the reference characteristics, then the user may be granted access to the cooler, and may be able to open the cooler. That may be particularly useful if the parents are trying to control the access to the wine cooler by preventing their adolescent children from opening the cooler.

The fact that not just one, but at least two characteristics are included in a combination is significant. For example, continuing with the wine cooler example, the combinations may be determined in such a way that overwriting or bypassing the security measures may be more difficult than if just one characteristic is used. If one characteristic is used, then the cooler security system may be easily compromised by forging for example the access code. For example, if the cooler security system is equipped with a papillary lines scanner, and requires that a requestor provides a correct imprint of the papillary lines of a thumb, then such a security system may be easily compromised by providing for example, paraffinic-based imprints of an authorized user. However, by employing two or more characteristics into the cooler security system, compromising such a system may be difficult. For example, if the system requires providing a correct imprint of the papillary lines of a thumb and a correct voice sample, both collected within a certain time period, then the security system employing such a combination of the two characteristics may be more reliable than if only one characteristic is used.

Examples of Biometric Characteristics

Figure 2:
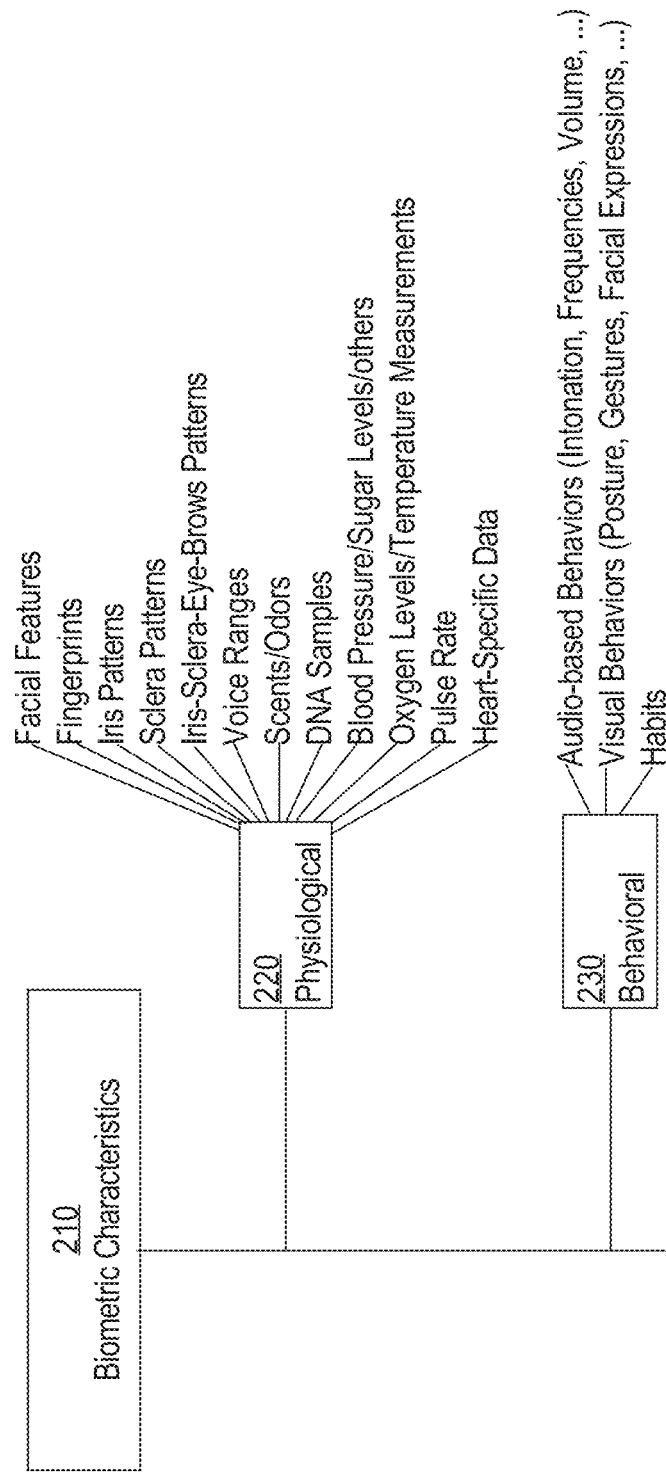
FIG. 2 illustrates examples of biometric characteristics.

FIG. 2 illustrates examples of biometric characteristics. In in the illustrated example, biometric characteristics 210 comprise a plurality of various types of characteristics, including physiological characteristics 220 and behavioral characteristics 230. Although the depicted example shows two types of characteristics, other types or other methods of dividing the biometric characteristics may also be implemented. The examples illustrated in FIG. 2 are non-limiting, and are not considered to be the only types of characteristics that may be used in the presented system.

In an embodiment, physiological characteristics 220 used in the presented system include various types and examples of the characteristics. The non-limiting examples include facial features, fingerprints, eye-iris patterns, eye-sclera patterns, eye-iris-sclera and eye-brows patterns, voice ranges, voice intonations, scents and body odors, DNA samples, blood pressure readings, sugar level readings, other human fluids readings, oxygen levels in human bodies, temperature measurements of human bodies, pulse rate readings, heart-specific data, and the like. Other types of physiological characteristics 220 may also be used in the presented system.

In an embodiment, behavioral characteristics 230 used in the presented system may include various types and examples of the characteristics. The non-limiting examples include audio-based behavioral characteristics, such as voice intonation, voice levels, voice frequencies, voice volume and other human-voice characteristics. Behavioral characteristics 230 may also include visual-based behavioral characteristics, such as human's postures, gestures, facial expressions, and the like. Furthermore, characteristic 230 may include habits' patterns, such as whether a user enters data using a right hand or a left hand, and the like.

The above examples of biometric characteristics are provided to illustrate some of the examples. Other types of the biometric characteristics not described in FIG. 2 may also be used.

Furthermore, the biometric characteristics may be used in combination with other, non-biometric characteristics. For example, a system may be configured to authorize access to a secured facility if a user provides a correct voice two or more samples and/or correct textual (non-biometric) information.

According to another example, a system may be configured to authorize an electronic financial transaction if a user provides correct textual (non-biometric) information and the system receive a scanned image of the user's eye-iris pattern that matches the eye-iris pattern saved for the users that are authorized to initiate such financial transactions.

By designing the system to use combinations of biometric characteristics and/or combinations of biometric and non-biometric characteristics, the system provides a high level of reliability and accuracy. For example, the systems that merely rely on user-provided textual credentials, such as user login and password information, are usually not very reliable since the textural credentials may be intercepted or otherwise obtained or generated. In contrast, the presented system may be difficult to comprise because the likelihood that an intruder may provide correct values of two or more different biometric characteristics of an authorized user is rather low. For example, while a user login and password to access a user's bank account may be easily intercepted, it may be quite difficult to intercept the correct user's voice sample and the correct user's oxygen level sample that match the samples stored for the user in a reference database.

Using two biometric or non-contact sensors may also reduce issues created by a user forgetting a passcode. Also, using these systems may make the authentication process more seamless for the user. For example, no prompts for a passcode need to be implemented. The user may simply engage or otherwise initiate the system and components of the system, such as biometric sensors employed by the system, can initiate an authentication of the user. Thus, the user is only inconvenienced when the user's request to access a device/resource is denied.

Collection of Biometric Characteristics

Figure 3:
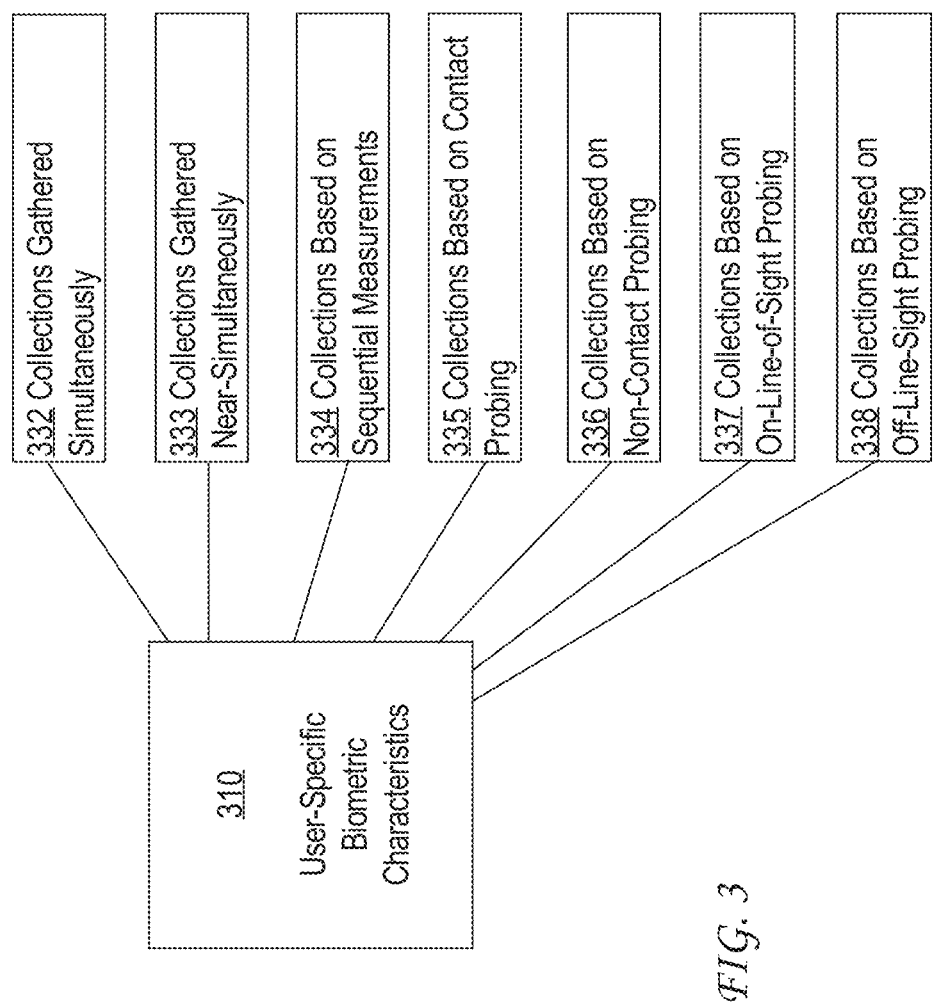
FIG. 3 illustrates various examples of collecting user-specific biometric characteristics.

FIG. 3 illustrates various examples of collecting user-specific biometric characteristics 310. The examples depicted in FIG. 3 are provided for illustration purposes and are not considered to be limiting in any sense.

In the depicted example, values of user-specific biometric characteristics 310 may be collected simultaneously, as depicted in 332, or almost-simultaneously as depicted in 333. The values may also be collected based on sequential measurements, as depicted in 334, collected based on a contact probing, as depicted in 336, or collected based on a non-contact probing, as depicted in 336. Furthermore, the values may be collected based on an on-line-of-sight probing, as depicted in 337, or collected based on an off-line-sight probing, as depicted in 338. Other methods of collecting values of the biometric and non-biometric characteristics may also be implemented.

Collectors of Biometric Characteristics

Figure 4:
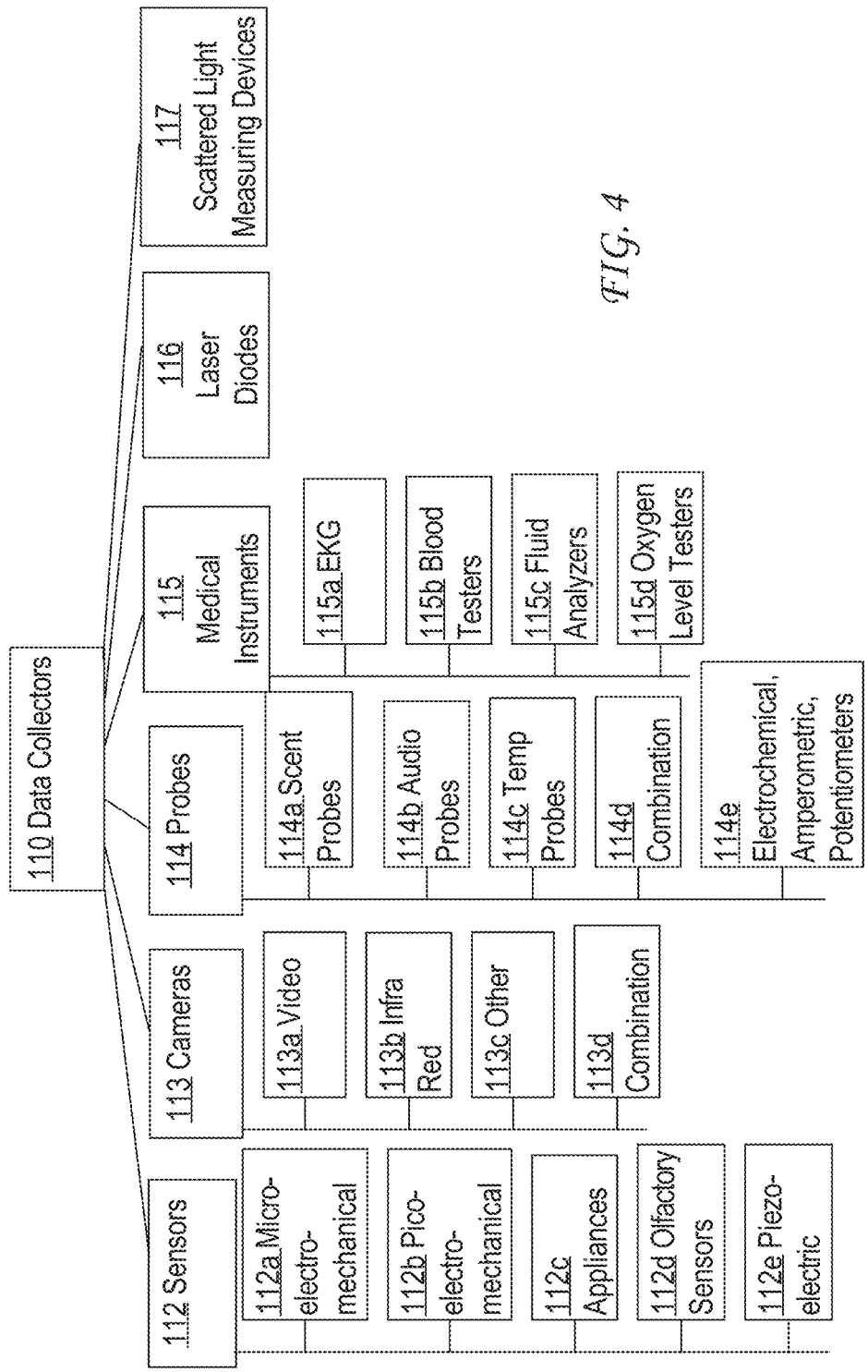
FIG. 4 illustrates various examples of collectors of biometric characteristics.

FIG. 4 illustrates various examples of collectors of biometric characteristics. The examples depicted in FIG. 4 are provided for illustration purposes and are not considered to be limiting in any sense.

In the depicted example, data collectors 110 include sensors 112, cameras 113, probes 114, medical instruments 115, laser diodes 116 and scattered light measuring devices 117. Other types of data collectors 110 may also be used.

Sensors 112 may include micro-electro-mechanical sensors 112a, pico-electro-mechanical sensors 112b, sensors 112c implemented in appliances, vehicles, elevators, olfactory sensors 112d, piezoelectric sensors 112e, and the like. Although not depicted in FIG. 4, sensors 112 may also include microphones, scanners and other devices configured to collect biometric data.

Cameras 113 may include video cameras 113a, infra-red cameras 113b, other types of cameras 113d and combinations of various types of cameras. The cameras may collect individual samples or may be programmed to collect a series of samples during certain time periods or sampled at certain time intervals.

Probes 114 may include scent and body odor probes 114a, audio signal probes 114b, temperature probes 114c, combinations of various types of probes 114d, electrochemical, ampere-metric and potentiometers 114e, and the like.

Medical instruments 115 may be used to collect specimens from users and perform medical tests on the specimens and users. Medical instruments 115 may include EKG devices 115a, blood testers, 115a, other fluid analyzers 115c, oxygen level testers 115d, and the like. Although not depicted in FIG. 4, the medical instruments may also include the instruments configured to measure a heart pulse rate, a blood pressure, and the like.

Laser diodes 116 may be used to use laser technology to collect values of biometric characteristics from users. For example, laser diodes 116 may be used to collect visual characteristics of user's palms, feet imprints, and the like.

Scattered light measuring devices 117 may be used to obtain readings of glucose levels in human bodies. Furthermore, scattered light measuring devices 117 may be used to measure a dehydration level by emitting a scattering pattern of incident light (also referred to as a "speckle effect"). Scattered light measuring devices 117 may also be used to measure a heart pulse rate, and the like.

Collecting User-Specific Biometric Characteristics

Figure 5:
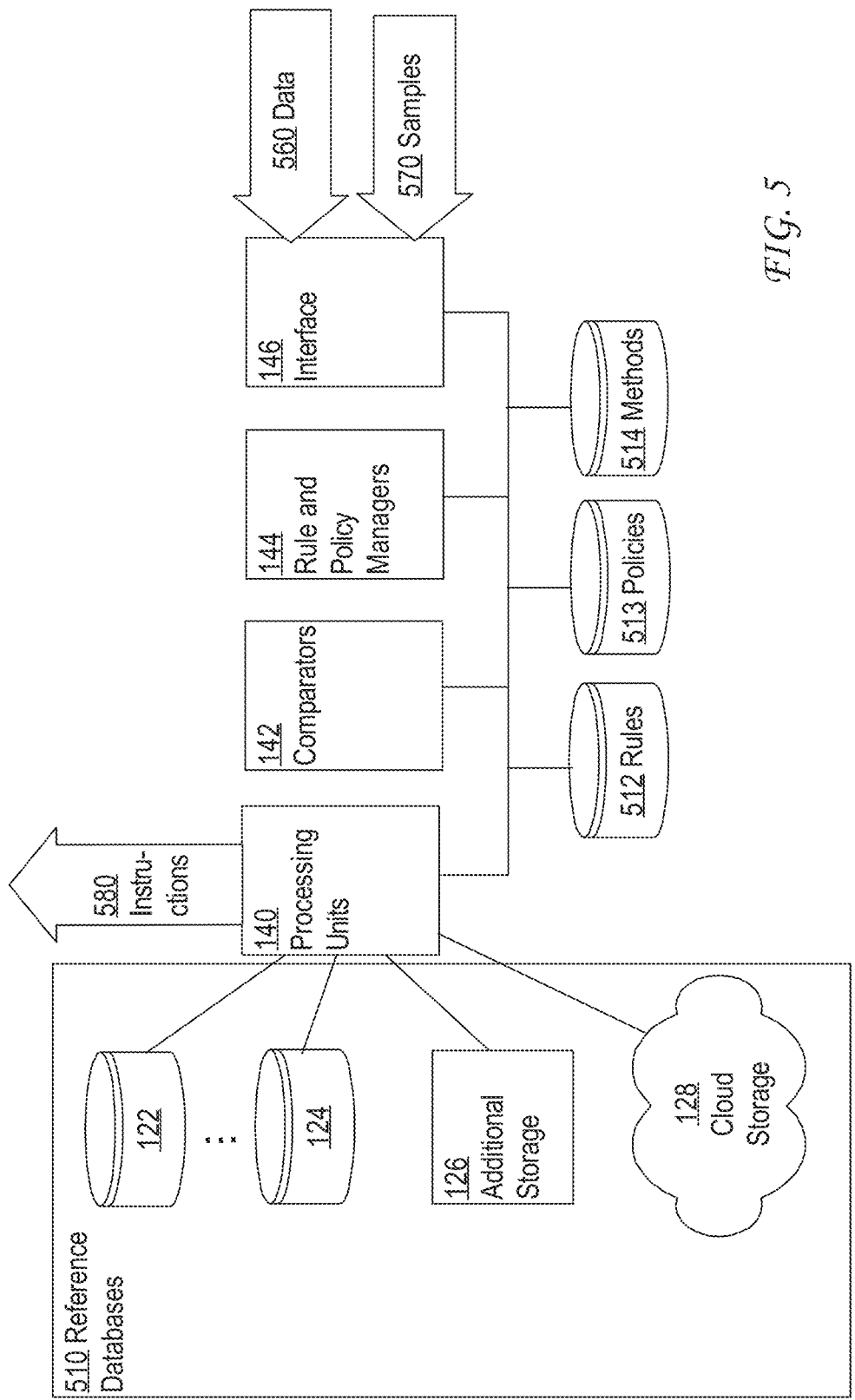
FIG. 5 illustrates an example of a process of collecting and using user-specific biometric attributes.

FIG. 5 illustrates an example of a process of collecting and using biometric user-specific attributes.

In an embodiment, data 560, consisting of values of biometric characteristics collected from users, is provided to a user interface 146, or other interface configured to receive data.

Interface 146 may provide data 560 to one or more processing units 140, one or more comparators 142, one or more rule and policy managers 144, and other types of units involved in collecting and processing user-specific biometric characteristics.

Data 560 may also be stored in one or more storage devices, organized as reference databases 510.

Reference databases 510 may comprise one or more disk-based storage devices 122, 124. Reference database 510 may also comprise one or more cloud storage systems 128 and any additional storage system 126.

Based on the collected user-specific biometric characteristics, one or more processing units 140 may determine one or more combinations of biometric characteristics. A user may have one or more combinations of biometric characteristics. The combinations are selected for a user in such a way that the values of each of the combinations created for the user uniquely identify the user. Examples of various characteristics are described in FIG. 2.

Combination of characteristics determined for a user may be stored in reference databases 510. The combinations may be used as references to determine later one whether a user may be granted access to devices and/or whether the user is capable of performing certain functions.

Comparators 142 may be configured to use data stored in reference databases 510 to compare them with values provided by a user when the user requests access to certain devices.

Rule and policy managers 144 may be configured to apply rules to requests submitted by users and to determine whether the user' requests may be granted. Rule and policy managers 144 may use values stored in reference databases 510, rules 512, policies 513 and method 514. Other components of the data processing apparatus for using user-specific biometric characteristics and attributes may also be implemented.

Using Reference Data to Identify/Authenticate Users

Continuing with the example depicted in FIG. 5, the system may be used to determine whether a user's request to access to resources may be granted, and/or whether a user is capable of performing certain functions.

In an embodiment, once reference databases 510 are created and values for one or more combinations of biometric characteristics for the users are created, the system may be deployed to perform an online identification/authentication of users. For example, a user may provide his samples 570 of two or more biometric characteristics to the system, and the system may determine whether a user request to access a resource may be granted.

Upon receiving samples 570, processing units 140 may determine an identification of the user, and use the identification data to retrieve one or more reference combinations stored for the user in reference databases 510.

Comparators 142 may use samples 570 and values of reference combinations stored for the user to determine whether a match between the samples and the reference values exists. The comparators may rely on rule and policy managers 144, which in turn may retrieve rules 512, policies 513 and methods 514. Additional elements and components may also be used by comparators 142.

If a match between user-provided samples 570 and user-specific reference values for the user is found, then processing units 140 may determine a response for the user. The response may include control instructions 580 for controlling a device which the user attempted to access. For example, the control instructions may allow the user to access an online bank account, to access a building, to request a secure printing on a printing device, and the like.

However, if processing units 140 determine that no match between user-provided samples 570 and user-specific reference values for the user is found, then processing units 140 may generate a rejection to the user's request to access a device. For example, processing units 140 may generate control instructions to lock a vehicle which the user tried to open.

User Profiles

In an embodiment, profiles are created for users. A profile created for an individual may contain values of two or more user-specific biometric parameters and may be used each time the user requests an access to a resource/device/appliance, or each time the user exhibits certain types of behavior. For example, when a user tries to use a tablet, one or more sensors mounted on the tablet may collect samples of the user's iris pattern and samples of the user's eye-brows, and use the samples to determine whether the collected samples match reference values stored in reference databases 510 for the user. If a match is found, then the user may be granted access to the tablet. However, if no match is found, then the user may be unable to use the tablet.

In an embodiment, values of two or more user-specific biometric parameters may be used to control user's access to one or more devices. For example, for each user and for each device which the user may be allowed to control, samples of different characteristics may be collected from the user in advance. When a user issues a request to access a particular device, the user would be asked to provide samples of such different characteristics. If, based on the user-provided samples, the user is positively authenticated, then the user may be authorized to use the particular device. Implementations of user profiles may vary.

Figure 8:
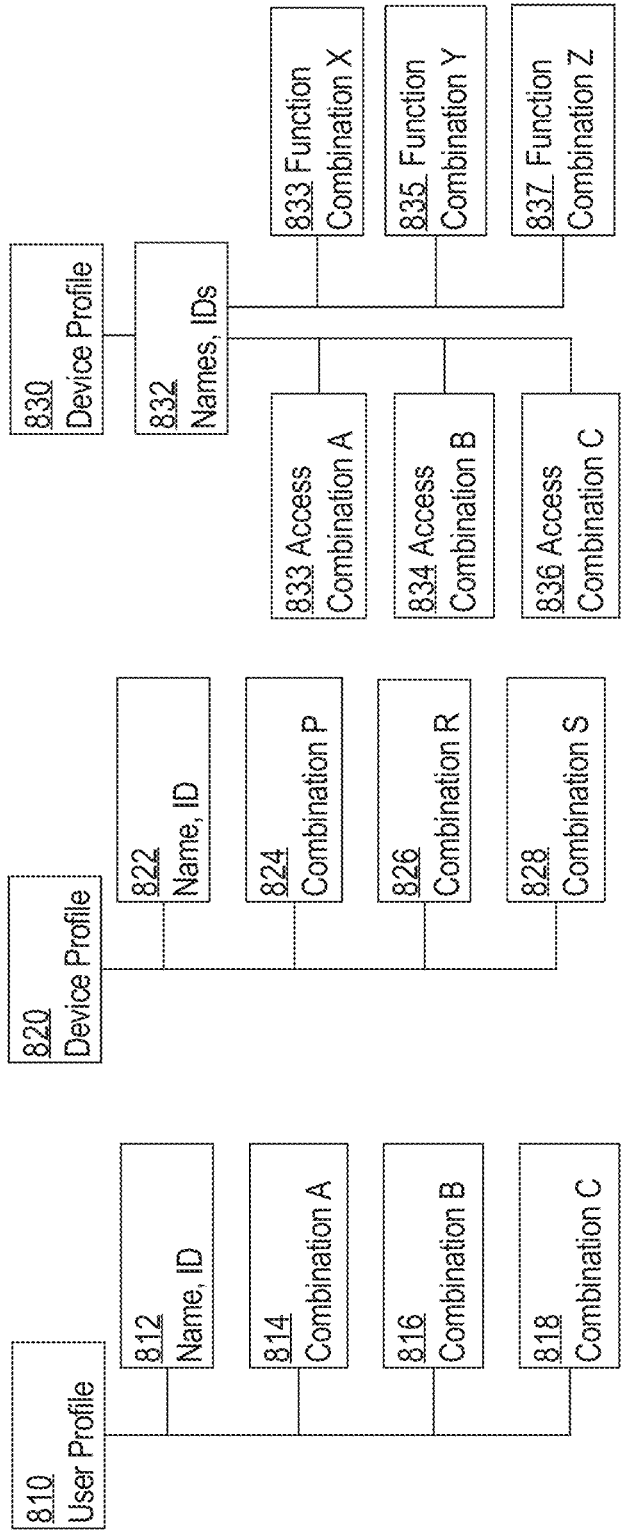
FIG. 8a illustrates an example user profile.
FIG. 8b illustrates an example device profile.
FIG. 8c illustrates an example device profile.

FIG. 8a illustrates an example user profile 810. In the depicted example, user profile 810 comprises one or more links, pointers, or other data structures configured to hold data. One of the links/pointers points to a data structure 812, configured to hold a user name, identification and other forms of user's identification. Another link/pointer may point to a data structure 814, configured to store values of combination A, which may be created to determine whether a user may access a tablet. Other link/pointer may point to a data structure 816, configured to store values of combination B, which may be created to determine whether the user may open a wine cooler. Other link/pointer may point to a data structure 818, configured to store values of combination C, which may be created to test whether the user is under influence of alcohol, and if so, allow processing units to generate control instructions, which when execute, would prevent the user from operating a vehicle.

In an embodiment, different user profiles may be used for different functions. For example, a user who initially gains access to a tablet may have to re-authenticate before accessing bank information using the tablet.

Furthermore, one or more rules may be implemented in the system. A rule associated with the bank account may require additional biometric information from one or more users. For example, the system may include a rule or the additional biometric information from other persons, such as a spouse, a child, and the like.

In an embodiment, a system is configured to create one or more rules, and to update the rules for one system from another system. For example, the system may update the user and/or device profile for a building access point remotely from a smart phone using one or more sensors associated with the smart phone. Thus, if a homeowner and his friend are remotely located from the house that is part of the disclosed system, then the home owner may remotely create a profile for his friend. The profile for the friend may be created remotely using the biometric sensors on a smart phone. The profile may allow the friend to access and enter the house when the homeowner is not present.

Other organization and types of user profiles may also be implemented.

Device Profiles

In an embodiment, profiles are created for devices. For example, a profile may be created for a device, such as a wine cooler. A device profile may include a set of combinations which contain biometric data of one or more user. If a user provides samples of the biometric attributes that match the data stored for the device in reference databases, then processing units may generate control instructions, which when executed, may cause opening the door of the wine cooler and allow the user to access the cooler.

FIG. 8b illustrates an example profile 820 created for a device. In the illustrated example, a device profile for a wine cooler may include combinations that contain Betty's biometric data, and combinations that contain John's biometric data. That way both Betty and John may be successfully authenticated to open the cooler if they provide correct samples of the biometric data.

In the case of a vehicle, a device profile may contain a set of combination created for accessing the vehicle, and a set of combinations for testing whether a driver is capable of performing certain functions. For example, one combination may include user samples that indicate whether a driver appears to be under the influence of alcohol. If a user attempts to start an engine of the vehicle, one or more cameras may collect visual depictions of the user and one or more scent-sensors may collect scent samples from the user. If processing units determine that the user appears to be under the influence of alcohol, then the processing units may generate control instruction, which when executed, would prevent the user from starting the engine of the vehicle.

Referring again to FIG. 8b, in the depicted example, device profile 820 comprises one or more links, pointers, or other data structures configured to hold data. One of the links/pointers points to a data structure 822, configured to hold a user name, identification and other forms of the user's identification. Another link/pointer may point to a data structure 824, configured to store values of combination P, which may be created to store and provide values to be matched with user's provided values and used to determine whether the user may access a tablet. Other link/pointer may point to a data structure 826, configured to store values of combination R, which may be created to store and provide values to be matched with user's provided values and used to determine whether the user may open a wine cooler. Other link/pointer may point to a data structure 828, configured to store values of combination S, which may be created to determine whether the user is under the influence of alcohol, and if a match is found, then to generate control instructions, which when executed, would prevent the user from operating a vehicle.

FIG. 8c is another example of a device profile 830. This example is a hybrid profile, and may comprise various elements of user's profile 810 and device profile 820. The depicted example illustrates one or more combinations A-C and one or more function combinations X-Z. The combinations may be organized for each user or for groups of users, whose names and identifications are provided in a data structure 832.

Example Work Flow

Figure 6:
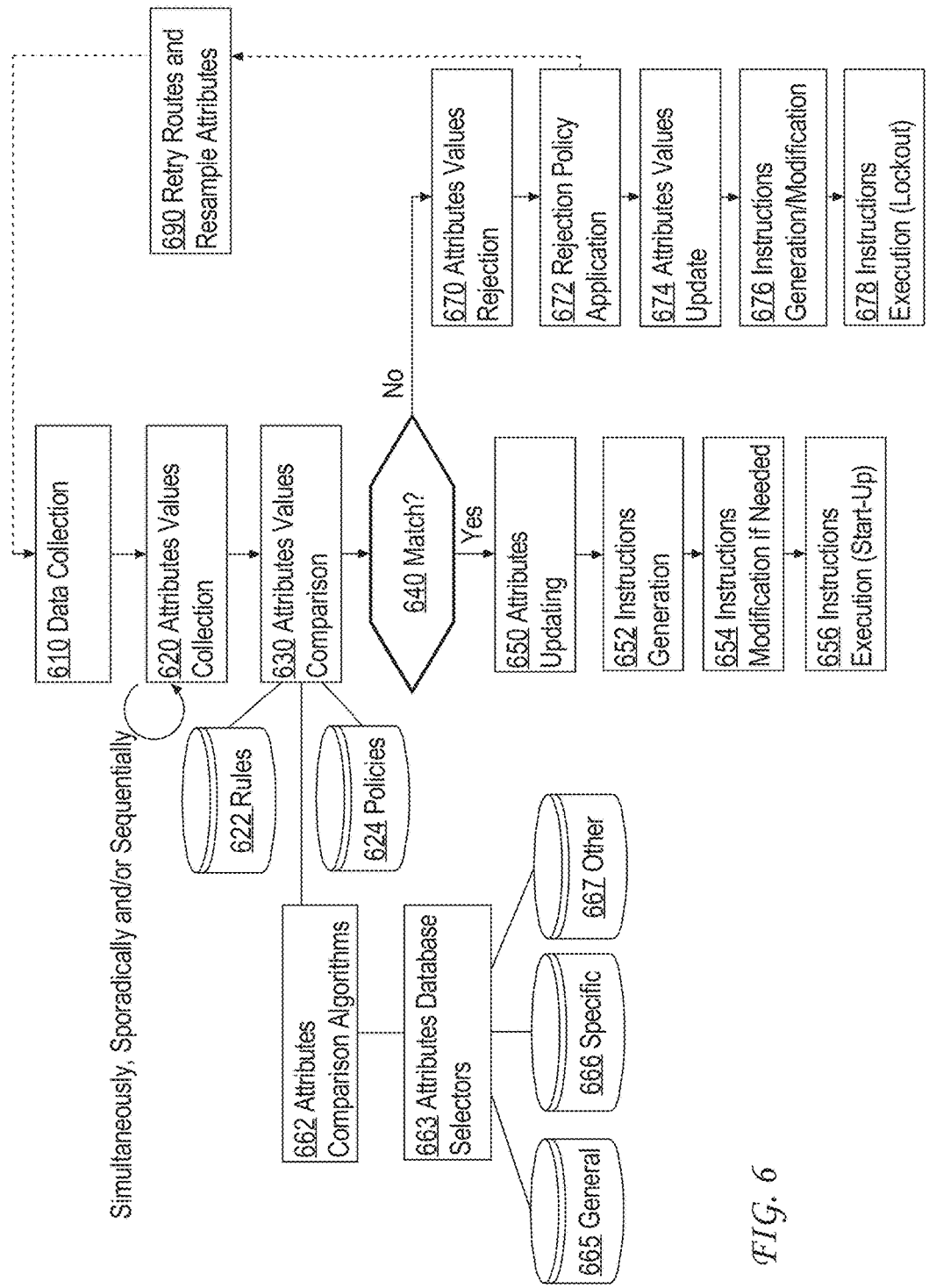
FIG. 6 illustrates an example of a process of using biometric user-specific attributes to identify/authenticate users.

FIG. 6 illustrates an example of a process of using biometric user-specific attributes. Data collection 610 may include data collected using a variety of methods. The collected data may include information about users, devices, attributes, characteristics, and the like.

Collection of attributes' values 620 may include determining unique combinations of biometric attributes and storing values of the combinations in reference databases 510. This type of collection may be performed off-line, or during a pre-deployment stage. For example, the data may be collected simultaneously, sporadically, and/or sequentially. Various collection methods are described in FIG. 3.

Collection of attributes' values 620 may also be performed once the system is deployed into production, and configured to process online requests. For example, the collection may include collecting, or otherwise receiving, data from users who request access to devices, and the like.

Comparison of attributes' values 630 may include comparing user-provided values of biometric attributes with the reference user-specific biometric attributes stored in reference databases 510. The comparison may involve invoking rules 622, policies 624, and comparisons algorithms 662. Comparison algorithms 662 may use attributes database selectors 663, which in turn may refer to general databases 665, specific databases 666 and other types of databases 667.

Multimodal biometric analysis systems utilize a combination of biometric attributes or values to control access to consumer oriented devices. The biometric system relies on a comparison of the biometric attributes or values stored in a reference database to those attributes or values measured at the time and place of use when access or authentication is requested.

The use of authenticator-ranking of biometric attributes or values can be used to address environmental circumstances which make a measurement and comparison of biometric attributes or values difficult, or measurements of the age of the reference biometric attributes or values used to make the comparison difficult. The ranking may change with environmental situations, the "age" of the reference biometric data, and so on as determined by the authenticator. Furthermore, the authenticator may use the ranking order as an additional security means to grant access or authorization.

For example, for use in adverse environments, such as a "noisy" environment or a low light environment, the authenticator may desire to establish a precedence of biometric attributes or values to be used: First biometric attributes or values resulting from touch or contact with the sensor, like a finger, thumb or palm prints or EKG pattern, then an iris or retinal scanning, and not utilizing either voice or speech recognition. Various other combinations of biometric attributes and values and orders of use can be devised.

Also, for example, in "low" light environments, the authenticator may established a different authentication order based first on voice or speech recognition, followed by a touch and not utilizing any biometric parameter based on facial recognition.

Further, the "authenticator" may desire to rank the use of the biometric attributes or values based on the 'age' of the reference data, thereby relying on the most recent reference biometric reference data, subsequently followed by other biometric data sequenced by its 'age, from the next most recent to the oldest.

Comparators may determine in step 640 whether a match is found between the user-provided values of biometric attributes and the reference user-specific biometric attributes stored in reference databases 510. If a match is found, then attributes updaters 650 may update the values of certain attributes or update selection of combinations.

Further, if a match is found, then processing units may generate a response to a user and control instructions 652 for addressing the user's request.

If needed, the instructions may be modified, as depicted in 654. For example, the instructions may be overwritten. The overwriting may be performed manually or automatically.

Final instructions may be executed, as depicted in 656. For example, the instructions may be executed at a security gate, and execution of the control instructions may allow the user to open the security gate and access the building.

However, if no match is found between the user-provided values of biometric attributes and the reference user-specific biometric attributes stored in reference databases 510, then the user-provided values of the biometric attributes are rejected, as depicted in 670. In the process, one or more rejections policies 672 may be applied, and the attributes' values in combinations may be updated, as depicted in 674.

Furthermore, one or more control instructions may be generated or modified, as depicted in 676. The instructions may be executed to, for example, reject a user's request to access a device or a user's request to operate a vehicle.

In an embodiment, upon rejection certain values of user's attributes, the algorithms for selecting one or more combinations for a user may be modified. For example, the algorithms may be refined, the routes may be retried (690) and values of the biometric attributes may be resampled.

Example Flow Chart

Figure 7:
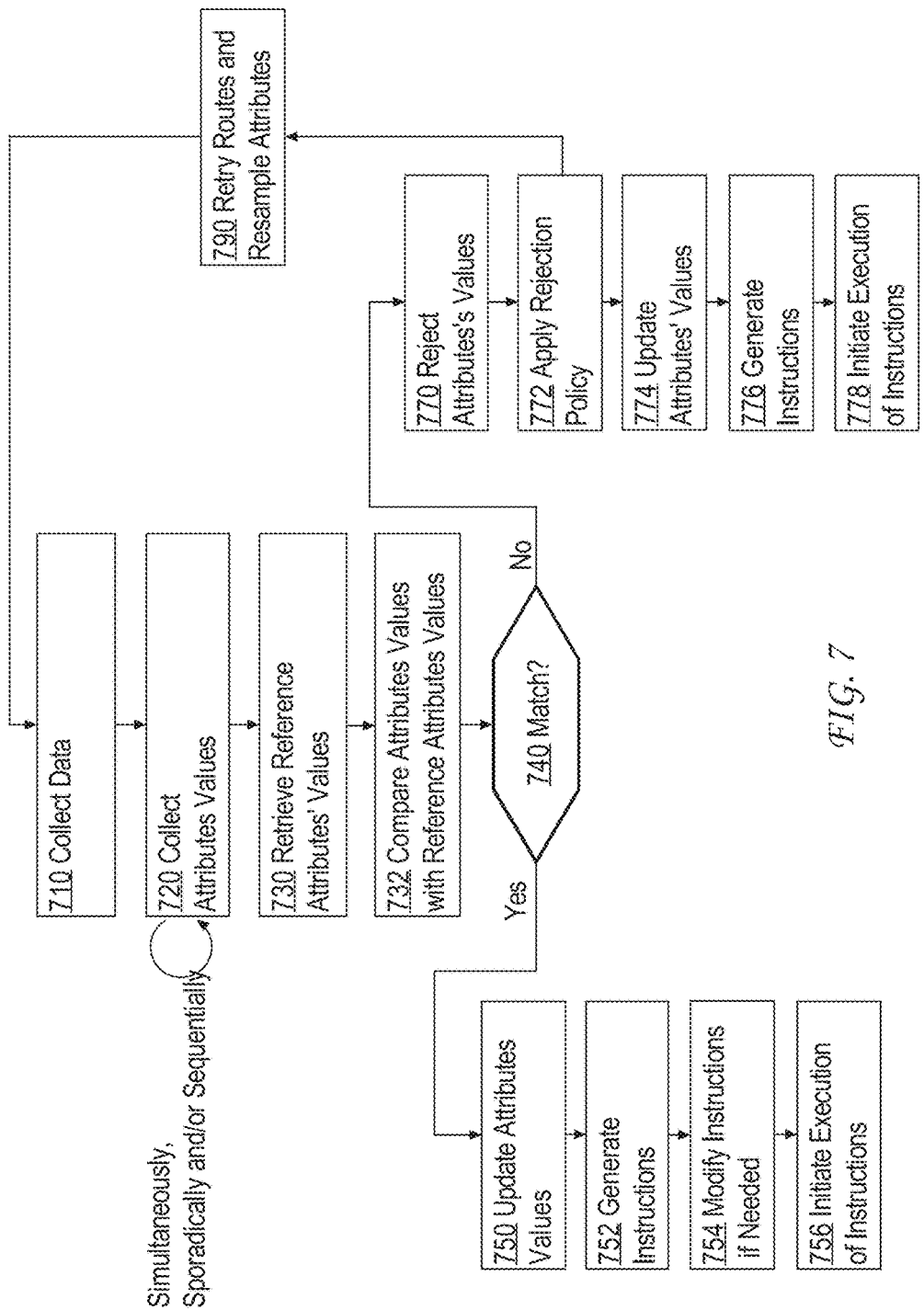
FIG. 7 illustrates an example flow chart of a process of using biometric user-specific attributes to identify/authenticate users.

FIG. 7 illustrates an example flow chart of a process of using biometric user-specific attributes to identify/authenticate users.

In step 710, the process collects data about users, combinations of biometric user-specific attributes, devices, rules, policies, and the like. This may include determining unique combinations of biometric attributes and storing values of the combinations in reference databases 510. This type of collection may be performed off-line, or during a pre-deployment stage.

In step 720, attributes' values are collected. The attributes' values may also be referred to as user-samples, or samples of user-specific biometric attributes. The samples may be collected using a variety of methods. For example, the samples may be collected simultaneously, sporadically and/or sequentially. Various collection methods are described in FIG. 3.

Collection of attributes' values may also be performed once the system is deployed into production, and configured to process online requests. For example, the collection may include collecting or otherwise receiving data from users who request access to devices, and the like.

In step 730, the process retrieves reference attributes' values. This step is a part of the online processing of users' requests. For example, if a user requested access to a building and the user provided his samples of biometric attributes, then such samples will be matched with the reference attributes' values.

In step 732, the process compares the user-provided values of biometric attributes with the reference user-specific biometric attributes stored in reference databases 510. The comparison may involve invoking rules 622, policies 624, and comparisons algorithms 662. Comparison algorithms 662 may use attributes database selectors 663, which in turn may refer to general databases 665, specific databases 666 and other types of databases 667.

Comparators may determine whether a match between the user-provided values of biometric attributes and the reference user-specific biometric attributes stored in reference databases 510 is found.

If in step 740, a match is found, then the values of certain attributes may be updated in step 750, and/or the selections of combinations may be updated.

Further, if a match is found, then in step 752, the process generates a response to a user and control instructions for addressing the user's request.

If needed, then in step 754, the instructions may be modified. For example, the instructions may be overwritten. The overwriting may be performed manually or automatically.

In step 756, the instructions may be executed. For example, the instructions may cause granting access to the device to which the user requested the access.

However, if no match is found between the user-provided values of biometric attributes with the reference user-specific biometric attributes stored in reference databases 510, then in step 770, the user-provided values of the biometric attributes are rejected.

In step 772, one or more rejections' policies may be applied, and in step 774, the attributes' values in combinations may be updated.

Furthermore, in step 776, one or more control instructions may be generated or modified.

In step 778, the instructions are executed to for example, reject a user's request to access a device or a user's request to operate a vehicle.

Alternatively, if no match is found between the user-provided values of biometric attributes with the reference user-specific biometric attributes stored in reference databases 510, then the process may retry routes, select different combinations of user-specific biometric characteristics, resample values of the biometric attributes, and perform other steps to refine the selection of the combinations, rules and policies.

In an embodiment, an approach is presented for identifying/authenticating an individual and for determining the individual's capabilities to perform certain functions based on the two or more biometric user-specific characteristics. The approach is more reliable and accurate than conventional systems that perform such steps by relying only on one parameter.

In an embodiment, an approach is presented that relies on a comparison between the values of two or more biometric user-specific parameters stored in a reference database and the values of the parameters entered to the system by the user when the user requests access to resources. The approach is more reliable and accurate than conventional systems that rely on a comparison based on the norms computed from averaged values sampled from a population of users.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
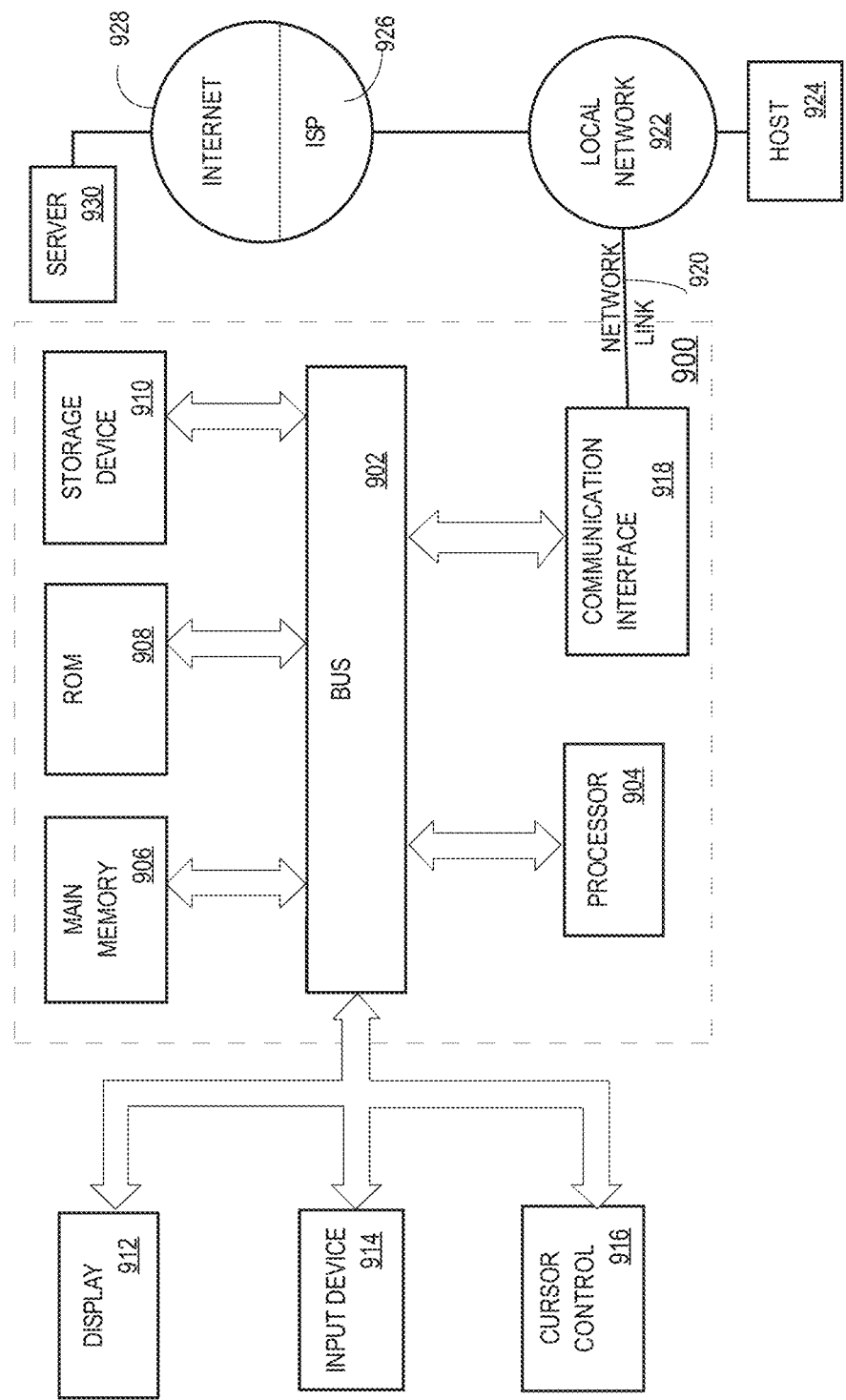
FIG. 9 is a block diagram of a computer system with which an embodiment may be used.

For example, FIG. 9 is a block diagram of a computer system with which an embodiment may be used. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

What is claimed is:

1. A computerized data processing method to control access to consumer devices, the method comprising:
    collecting, as a consumer device is being accessed by a user, a plurality of user-specific parameter values;
    determining that the plurality of user-specific parameter values was collected in an adverse environment;
    determining a ranking for the plurality of user-specific parameter values, which are collected as the consumer device is being accessed, by:
        in the ranking, assigning high ranks to one or more first values, from the plurality of user-specific parameter values, obtained as results of a contact with a sensor, and
        in the ranking, assigning low ranks to one or more second values, of the plurality of user-specific parameter values, obtained as results of an object scanning;
    based on the ranking, selecting, from the plurality of user-specific parameter values, at least two of the plurality of user-specific parameter values that have the highest ranks;
    determining two or more parameter categories to which the at least two of the plurality of user-specific parameter values belong;
    for each of the two or more parameter categories, retrieving, from a reference database, at least one user-specific reference value that belongs to a parameter category of the two or more parameter categories and that has been stored in the reference database for the user;
    for each of the two or more parameter categories, determining whether any of the at least two of the plurality of user-specific parameter values matches the at least one user-specific reference value that belongs to a parameter category of the two or more parameter categories; and
    in response to determining, for each of the two or more parameter categories, that at least one of the at least two of the plurality of user-specific parameter values matches the at least one user-specific reference value that belongs to a parameter category of the two or more parameter categories, granting, to the user, access to the consumer device.

2. The computerized data processing method of claim 1, wherein the adverse environment includes one or more of: a noisy environment or a low light environment; and wherein the consumer device is any one of: a computerized security device, a motorized vehicle, a motorized machinery, a domestic appliance, a bank kiosk, a television set, a setup box, a play station, a movie recorder, a computer device, a portable device, a smart phone, or a digital camera.

3. The computerized data processing method of claim 1, wherein granting, to the user, access to the consumer device comprises one or more of:

positively authenticating the user with a security system of the consumer device;

determining that the user is capable of performing one or more functions with respect to the consumer device, including starting the consumer device, operating the consumer device, or accessing resources of the consumer device;

permitting to continue operating the consumer device;

permitting to withdraw funds from a bank account using the consumer device;

permitting to deposit funds to a bank account using the consumer device;

permitting to watch a specially-rated television program on the consumer device;

permitting to record a specially-rated television program on the consumer device;

permitting to play a specially-rated program on the consumer device;

permitting to access computer resources of the consumer device; or permitting to use functionalities of the consumer device.

4. The computerized data processing method of claim 1, further comprising:

in response to determining that, for each of the two or more parameter categories, none of the at least two of the plurality of user-specific parameter values matches the at least one user-specific reference value, denying, to the user, access to the consumer device.

5. The computerized data processing method of claim 4, wherein denying, to the user, access to the consumer device comprises one or more of:

refusing to positively authenticate the user with a security system of the consumer device;

determining that the user is incapable of performing one or more functions with respect to the consumer device, including starting the consumer device, operating the consumer device, or accessing resources of the consumer device;

turning off the consumer device;

preventing the user from withdrawing funds from a bank account using the consumer device;

preventing the user from depositing funds to a bank account using the consumer device;

preventing the user from watching a specially-rated television program on the consumer device;

preventing the user from recording a specially-rated television program on the consumer device;

preventing the user from playing a specially-rated program on the consumer device;

preventing the user from accessing computer resources of the consumer device; or preventing the user from using functionalities of the consumer device.

6. The computerized data processing method of claim 1, wherein the plurality of user-specific parameter values includes two or more of: user credentials, a textual-based parameter value, a digital image, a biometric parameter value, a physiological parameter value, or a behavioral parameter value.

7. The computerized data processing method of claim 1, wherein the one or more first values, from the plurality of user-specific parameter values, are resulting from touching the sensor with one or more of: a finger, a thumb, or a palm of a hand.

8. The computerized data processing method of claim 1, wherein the one or more second values, of the plurality of user-specific parameter values, are resulting from one or more of: scanning the user's iris, scanning the user's retina, or scanning the user's face.

9. A computer system comprising:

one or more hardware processors;

a data collector performing:

collecting, as a consumer device is being accessed by a user, a plurality of user-specific parameter values;

a computer processor performing:

determining that the plurality of user-specific parameter values was collected in an adverse environment;

determining a ranking for the plurality of user-specific parameter values, which are collected as the consumer device is being accessed, by:

in the ranking, assigning high ranks to one or more first values, from the plurality of user-specific parameter values, obtained as results of a contact with a sensor, and in the ranking, assigning low ranks to one or more second values, of the plurality of user-specific parameter values, obtained as results of an object scanning;

based on the ranking, selecting, from the plurality of user-specific parameter values, at least two of the plurality of user-specific parameter values that have the highest ranks;

determining two or more parameter categories to which the at least two of the plurality of user-specific parameter values belong;

for each of the two or more parameter categories, retrieving, from a reference database, at least one user-specific reference value that belongs to a parameter category of the two or more parameter categories and that has been stored in the reference database for the user;

for each of the two or more parameter categories, determining whether any of the at least two of the plurality of user-specific parameter values matches the at least one user-specific reference value that belongs to a parameter category of the two or more parameter categories; and in response to determining, for each of the two or more parameter categories, that at least one of the at least two of the plurality of user-specific parameter values matches the at least one user-specific reference value, granting, to the user, access to the consumer device.

10. The computer system of claim 9, wherein the adverse environment includes one or more of: a noisy environment or a low light environment; and wherein the consumer device is any one of: a computerized security device, a motorized vehicle, a motorized machinery, a domestic appliance, a bank kiosk, a television set, a setup box, a play station, a movie recorder, a computer device, a portable device, a smart phone, or a digital camera.

11. The computer system of claim 9, wherein granting, to the user, access to the consumer device comprises one or more of:

positively authenticating the user with a security system of the consumer device;

determining that the user is capable of performing one or more functions with respect to the consumer device, including starting the consumer device, operating the consumer device, or accessing resources of the consumer device;

permitting to continue operating the consumer device;

permitting to withdraw funds from a bank account using the consumer device;

permitting to deposit funds to a bank account using the consumer device;

permitting to watch a specially-rated television program on the consumer device;

permitting to record a specially-rated television program on the consumer device;

permitting to play a specially-rated program on the consumer device;

permitting to access computer resources of the consumer device; or permitting to use functionalities of the consumer device.

12. The computer system of claim 9, wherein the computer processor also performs:

in response to determining that, for each of the two or more parameter categories, none of the at least two of the plurality of user-specific parameter values matches the at least one user-specific reference value, denying, to the user, access to the consumer device.

13. The computer system of claim 12, wherein denying, to the user, access to the consumer device comprises one or more of:

refusing to positively authenticate the user with a security system of the consumer device;

determining that the user is incapable of performing one or more functions with respect to the consumer device, including starting the consumer device, operating the consumer device, or accessing resources of the consumer device;

turning off the consumer device;

preventing the user from withdrawing funds from a bank account using the consumer device;

preventing the user from depositing funds to a bank account using the consumer device;

preventing the user from watching a specially-rated television program on the consumer device;

preventing the user from recording a specially-rated television program on the consumer device;

preventing the user from playing a specially-rated program on the consumer device;

preventing the user from accessing computer resources of the consumer device; or preventing the user from using functionalities of the consumer device.

14. The computer system of claim 9, wherein the plurality of user-specific parameter values includes two or more of: user credentials, a textual-based parameter value, a digital image, a biometric parameter value, a physiological parameter value, or a behavioral parameter value.

15. The computer system of claim 9, wherein the one or more first values, from the plurality of user-specific parameter values, are resulting from touching the sensor with one or more of: a finger, a thumb, or a palm of a hand.

16. The computer system of claim 9, wherein the one or more second values, of the plurality of user-specific parameter values, are resulting from one or more of: scanning the user's iris, scanning the user's retina, or scanning the user's face.

17. One or more non-transitory computer storage media storing instructions which, when executed by one or more computer processors, cause performing:

collecting, as a consumer device is being accessed by a user, a plurality of user-specific parameter values;

determining that the plurality of user-specific parameter values was collected in an adverse environment;

determining a ranking for the plurality of user-specific parameter values, which are collected as the consumer device is being accessed, by:

in the ranking, assigning high ranks to one or more first values, from the plurality of user-specific parameter values, obtained as results of a contact with a sensor, and in the ranking, assigning low ranks to one or more second values, of the plurality of user-specific parameter values, obtained as results of an object scanning;

based on the ranking, selecting, from the plurality of user-specific parameter values, at least two of the plurality of user-specific parameter values that have the highest ranks;

determining two or more parameter categories to which the at least two of the plurality of user-specific parameter values belong;

for each of the two or more parameter categories, retrieving, from a reference database, at least one user-specific reference value that belongs to a parameter category of the two or more parameter categories and that has been stored in the reference database for the user;

for each of the two or more parameter categories, determining whether any of the at least two of the plurality of user-specific parameter values matches the at least one user-specific reference value that belongs to a parameter category of the two or more parameter categories; and in response to determining, for each of the two or more parameter categories, that at least one of the at least two of the plurality of user-specific parameter values matches the at least one user-specific reference value, granting, to the user, access to the consumer device.

18. The one or more non-transitory computer storage media of claim 17, wherein the adverse environment includes one or more of: a noisy environment or a low light environment; and wherein the consumer device is any one of: a computerized security device, a motorized vehicle, a motorized machinery, a domestic appliance, a bank kiosk, a television set, a setup box, a play station, a movie recorder, a computer device, a portable device, a smart phone, or a digital camera.

19. The one or more non-transitory computer storage media of claim 17, wherein granting, to the user, access to the consumer device comprises one or more of:

positively authenticating the user with a security system of the consumer device;

determining that the user is capable of performing one or more functions with respect to the consumer device, including starting the consumer device, operating the consumer device, or accessing resources of the consumer device;

permitting to continue operating the consumer device;

permitting to withdraw funds from a bank account using the consumer device;

permitting to deposit funds to a bank account using the consumer device;

permitting to watch a specially-rated television program on the consumer device;

permitting to record a specially-rated television program on the consumer device;

permitting to play a specially-rated program on the consumer device;

permitting to access computer resources of the consumer device; or permitting to use functionalities of the consumer device.

20. The one or more non-transitory computer storage media of claim 17, storing additional instructions for:
- in response to determining that, for each of the two or more parameter categories, none of the at least two of the plurality of user-specific parameter values matches the at least one user-specific reference value, denying, to the user access, to the consumer device;
- wherein denying, to the user, access to the consumer device comprises one or more of:
  - refusing to positively authenticate the user with a security system of the consumer device;
  - determining that the user is incapable of performing one or more functions with respect to the consumer device, including starting the consumer device, operating the consumer device, or accessing resources of the consumer device;
  - turning off the consumer device;
  - preventing the user from withdrawing funds from a bank account using the consumer device;
  - preventing the user from depositing funds to a bank account using the consumer device;
  - preventing the user from watching a specially-rated television program on the consumer device;
  - preventing the user from recording a specially-rated television program on the consumer device;
  - preventing the user from playing a specially-rated program on the consumer device;
  - preventing the user from accessing computer resources of the consumer device; or
  - preventing the user from using functionalities of the consumer device.

\* \* \* \* \*